Aug. 1, 1950     F. W. HOCHMUTH     2,516,992
CHEMICAL CONDENSER AND RECOVERY UNIT

Filed Sept. 25, 1946     2 Sheets—Sheet 1

INVENTOR
FRANK W. HOCHMUTH
BY Carlton F. Bryant
ATTORNEY

Aug. 1, 1950

F. W. HOCHMUTH 2,516,992

CHEMICAL CONDENSER AND RECOVERY UNIT

Filed Sept. 25, 1946

INVENTOR
FRANK W. HOCHMUTH
BY
Carlton F. Bryant
ATTORNEY

Patented Aug. 1, 1950

2,516,992

UNITED STATES PATENT OFFICE 2,516,992

CHEMICAL CONDENSER AND RECOVERY UNIT

Frank W. Hochmuth, New York, N. Y., assignor to Combustion Engineering-Superheater, Inc., a corporation of Delaware Application September 25, 1946, Serial No. 699,119

7 Claims. (Cl. 23—262)

This invention relates to the recovery of chemical from the gases which leave chemical recovery units such as are used in paper pulp mills that employ the sulphate process of pulp digestion.

In the sulphate process of paper pulp manufacture, wood chips are cooked in digesters containing so-called "white" liquor. The resulting pulp taken from the digesters is washed and prepared for shipment or use. The so-called "black" liquor separated from the removed pulp is thereupon passed through evaporators for greater concentration and is then burned in a special furnace to remove organic matter, the dissolved non-fibrous portion of the wood, and to recover chemicals.

A portion of the chemicals thus recovered from the burned black liquor is carried in suspension by the gases through the recovery furnace and through an associated boiler that converts the furnace heat into useful steam. Upon leaving the boiler the gases and extrained chemicals generally pass through an evaporator before finally passing to the chimney. This evaporator recovers some of the remaining chemicals from the gases but an undesirable amount of valuable chemical content still escapes from the evaporator with the gases and thus represents an economic loss.

It is an object of this invention to reduce the above loss by providing novel means for extracting chemicals from the exit gases of recovery furnaces.

Additional objects and advantages of the invention will appear from the following description of a preferred embodiment thereof when considered in conjunction with the accompanying drawings wherein.

Figure 1:
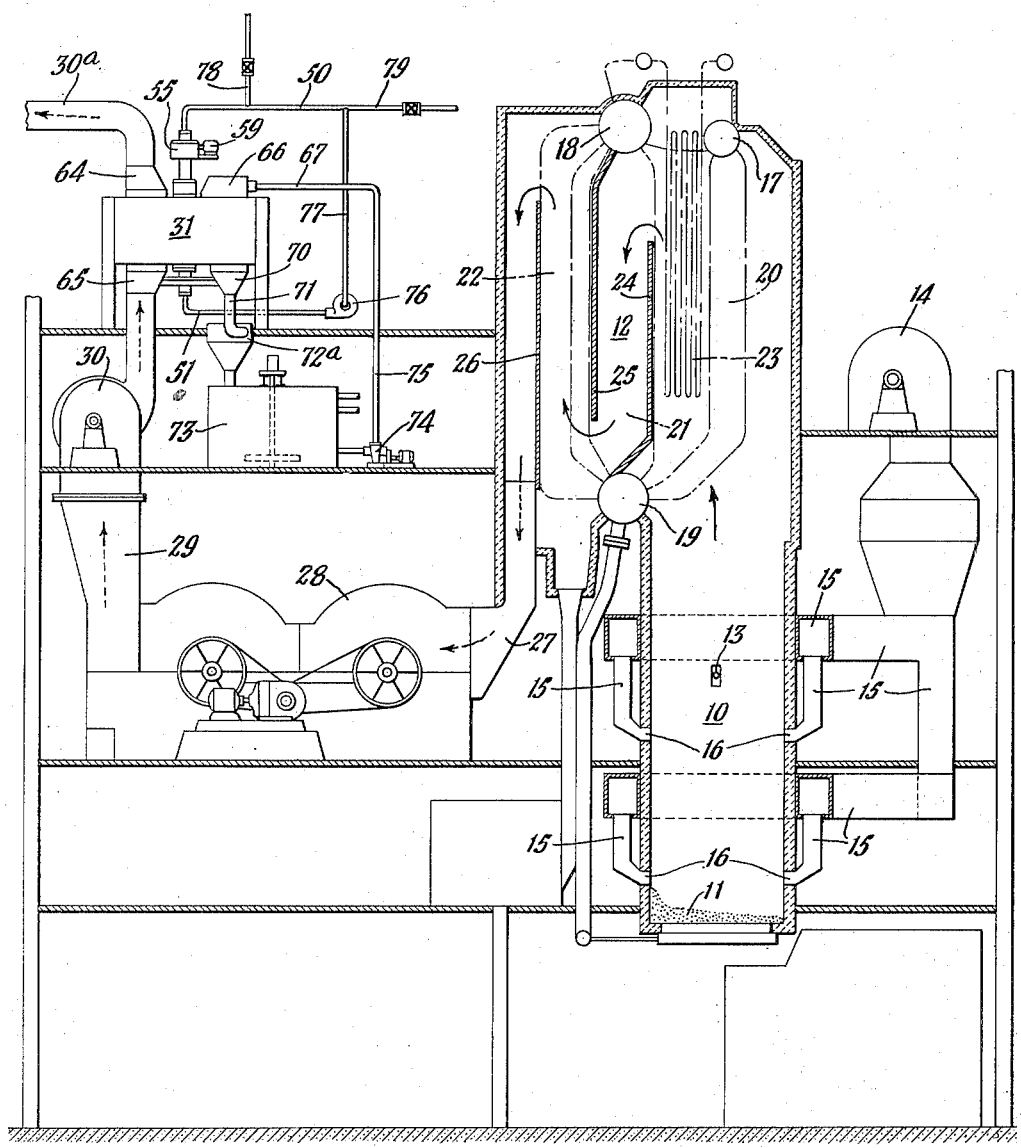
Figure 1 is a vertical elevation (partly in cross section) of a chemical recovery furnace and boiler unit showing associated apparatus for treating the combustion gases after they leave said unit.

Referring to Fig. 1, 10 denotes a recovery furnace having a hearth 11 and superimposed boiler 12. The black liquor, evaporated to the desired density and at the proper temperature, is introduced into the furnace chamber 10 by nozzles 13. The air for combustion is supplied by means of fan 14 through ducts 15 and is delivered into the furnace through nozzles 16 which are connected to ducts 15.

The steam boiler comprises upper steam and water drums 17 and 18 and lower water drum 19 interconnected by banks of tubes 20, 21 and 22. A superheater 23 may be suspended between banks 20 and 21. Baffles 24, 25 and 26 cause the gases rising from the furnace chamber 10 to flow through the boiler in passes longitudinally to the tubes and to be delivered via duct 27 to an evaporator 28 which may be of the so-called "cascade" type. The gases leave evaporator 28 via duct 29 and are delivered by induced draft fan 30 through the dust recovery apparatus 31 to the stack breeching 30a.

In operation black liquor is sprayed into furnace 10 through nozzles 13 in coarse particles which gravitate in counterflow to the rising flame and gas stream from the fuel bed on the hearth 11 below. During its flight through space the black liquor is dried and partly volatilized by the heat from the burning constituents of the liquor. Part of the combustion occurs within the furnace space but the larger part takes place on the hearth 11 at the bottom of the furnace. Air for combustion is delivered to the fuel bed on the hearth and into the furnace thereabove through nozzles 16 and the products of combustion rise upwardly through the furnace and thence through the steam boiler 13 to the evaporator 28.

When heat is applied to the black liquor passing through the furnace in the manner described, sodium carbonate, $Na_2CO_3$, sodium sulphide, $Na_2S$, and other sodium compounds appear in the smelt on the hearth 11. A portion of the chemicals within the furnace, principally sodium carbonate and sodium sulphide, is carried in suspension by the products of combustion from the furnace 10 through the boiler 12 to the evaporator 28. Before entering the boiler proper, over the top of baffle 24, the products of combustion are cooled to a temperature, approximately 1200 deg. F., below which the entrained chemical will not adhere to the boiler tubes, and any chemical settling upon the tubes may be readily blown off whence it passes on with the gases or separates out into the hopper below boiler bank 22. A portion of the chemical agglomerates on being cooled and falls back into the furnace.

The evaporator illustratively represented at 28 contains a number of plates mounted on shafts for rotation which alternately dip into a body of liquor within the evaporator and pass through the stream of the products of combustion. Such an evaporator is shown in the U. S. patent to Cash No. 2,403,211. A substantial portion of the chemical in the products adheres to the wetted plates and is washed off as the plates dip into the liquor. Much chemical is thereby recovered in the liquor to be burned but an undesirable amount still escapes therefrom with the products to the stack and, in the absence of recovery means, represents a loss of chemical.

Figure 2:
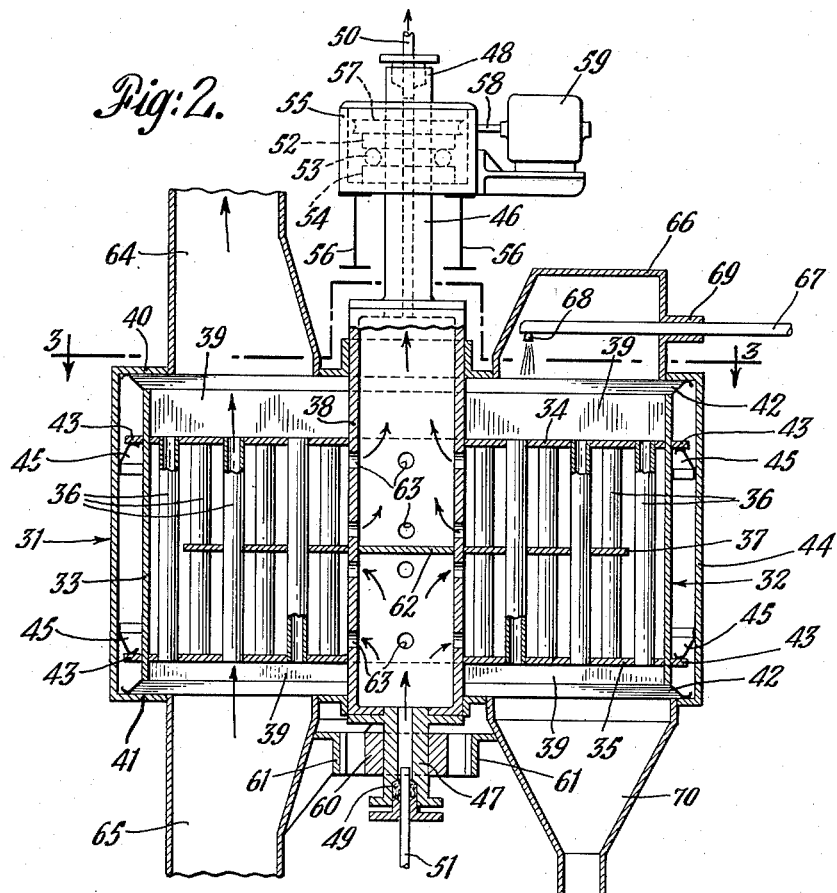
Figure 2 is an elevation in cross section of an embodiment of the new dust recovery apparatus that is included in the complete system of Fig. 1.
Figure 3:
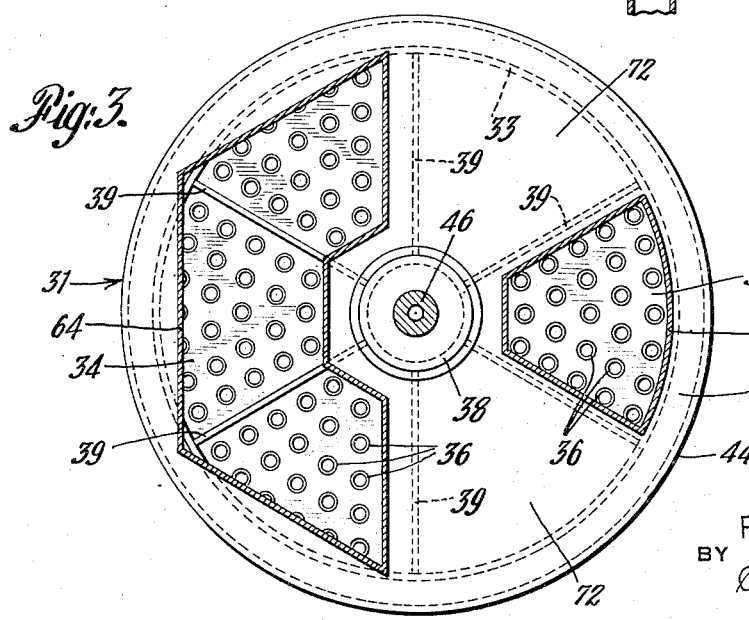
Figure 3 is a plan section on line 3—3 of Fig. 2 showing the apparatus rotor within the housing.

According to the invention I provide novel recovery apparatus 31 through which the stack or flue gases flow and from which a substantial amount of chemical is recovered in a manner to be described. The temperature of the gases leaving the evaporator 28 approximates 300 deg. F. I have discovered that when a cooler metallic surface, as at a temperature of about 200 deg. F., is inserted in the flue gas stream from the evaporator that a rapid condensation of the gases occurs on the metallic surface with a pronounced precipitation of the chemicals on the metal. I have further found that the metallic surface preferably should be in a dry and clean condition; also that the surface may effectively be kept cool by providing a hollow construction, such as the tubes 36 shown (Figs. 2-3), through which the gases flow and around which a cooling fluid circulates.

The invention thus contemplates compact and efficient apparatus 31 for recovering chemical from the flue gases flowing from evaporator 28 through duct 29, fan 30, apparatus 31 to the stack 30a. One illustrative form of this apparatus 31 is shown in detail in Figs. 2 and 3. It utilizes a rotor 32 which comprises a drum having a cylindrical wall 33 and top and bottom tube sheets 34 and 35. The latter sheets are provided with holes into which are rolled a multiplicity of parallel tubes 36. Between the two tube sheets 34 and 35 is a baffle 37 which is circular but of smaller diameter than the cylinder 33. Centrally of the rotor 32 is a hollow tube 38 to which the top and bottom sheets 34 and 35 are fastened for support.

A multiplicity of ribs 39, in this instance six (see Fig. 3), extend radially from the central tube 38 to the cylinder 33 both above the upper tube sheet 34 and below the lower tube sheet 35. The top and bottom edges of these top and bottom ribs 39 lie in planes normal to the axis of rotor 32 and are parallel to and spaced from the top and bottom casings 40 and 41 respectively of the apparatus 31. Each of said ribs 39 as well as the top and bottom edges of cylinder 33 is provided with sealing means 42 which rotate with the rib and cylinder and contact with the respective casings 40 and 41 so as to form a seal therebetween. Circumferential of the cylinder 33 are provided circular rib extentions 43 which are slightly spaced from the stationary cylindrical casing 44 surrounding the rotor 32. Flexible seals 45 mounted on casing 44 and extending inwardly ride on said ribs 43.

The central tube 38 which carries the entire rotor structure is mounted for rotation to top and bottom hollow shafts 46 and 47, each of said shafts being provided at their ends with stuffing boxes 48 and 49 into which extend the fluid cooling pipes 50 and 51 (also shown in Fig. 1). The top shaft 46 is provided with a collar 52 fastened thereto, the collar being supported by a thrust bearing such as the ball bearing 53 which in turn is carried by a ball race 54 supported within casing 55. The casing in turn is supported by beams 56 (see Fig. 2). Attached to collar 52 is worm wheel 57 which is driven by a worm through shaft 58 by motor 59. The bottom shaft 47 runs in a bearing 60 which is supported by angles 61.

Central tube 38 is provided with a centrally located partition 62 and with a multiplicity of holes 63 which provide communication between the tube 38 and the interior of the rotor 32. Thus, cooling fluid entering through bottom pipe 51 will flow through the holes 63 below partition 62 into the intertube space of the rotor 32 thence outwardly around the tubes 36 and around the ends of partition 37, thence inwardly around the tubes and through holes 63 into central tube 38 above partition 62, thence up through upper hollow shaft 46 to pipe 50.

Connected to top casing 40 is an offtake flue 64 and connected to bottom casing 41 is an inlet flue 65. Connected to the top casing 40 and diametrically opposite from offtake flue 64 is a box 66 in which is provided a pipe 67 having a nozzle 68 for blowing a fluid down through tubes 36. Pipe 67 passes through a sleeve 69 in box 66 so that it may be moved longitudinally back and forth thereby directing the fluid leaving nozzle 68 in a downwardly direction as shown by the arrows into all of the tubes 36. Below casing 41 is provided a hopper 70 which terminates in a pipe 71.

As rotor 32 rotates, tubes 36 pass between the openings of intake and offtake flues 65 and 64 permitting the flue gases to flow therethrough. The same tubes 36 then rotate from said opening between the solid segments 72 (see Fig. 3) of top and bottom casings 40 and 41. Then said tubes 36 pass under the box 66 and over hopper 70 while the fluid from nozzle 68 blows any dust deposit (chemical or other) within the tubes down into hopper 70. Thereafter said tubes 36 rotate from under box 66 between the other solid segments 72 of top and bottom casings 40 and 41 and finally again pass between the openings of intake and offtake flues 65 and 64. As the ribs 39 and top and bottom edges of cylinder 33 pass under said segments 72 their seals 42 which contact the casings 40 and 41 form barriers to prevent the flue gases from passing into the box 66 or hopper 70.

Preferably the dust-blowing fluid introduced through pipe 67 and nozzle 68 is compressed air although any other suitable fluid may be used. Should a liquid, such as a weak green liquor, be used for cleaning the tubes 36 a second pipe, similar to pipe 67 and nozzles 68, may be used to introduce a drying medium to dry the tubes 36 after they have been washed clean by the liquid. Such drying fluid will, of course, be introduced after the fluid in direction of rotation of the tubes 36.

To pipe 71 at the bottom of hopper 70 there is connected a separator 72a (see Fig. 1), as of the cyclone type, for separating the dust from the fluid used as a cleanser or from the drying medium. The separated chemical or the chemical carried by the washing liquid is delivered from separator 72a to dissolving tank 73. If a weak liquor is used, it may be recirculated, until a desired concentration is obtained, traveling from tank 73 via pump 74 and pipe 75 to pipe 67. From tank 73 the liquor may be added to the system as make up liquor.

The heat accumulated by the cooling water which is circulated by pump 76 via pipe 51 through the rotor 32 through pipes 50 and 77 may be reclaimed by a heat exchanger (not shown) or some of the heated water may be wasted through pipe 78 and replaced by cold water through pipe 79 so as to keep the desired temperature within the rotor 32.

While the preferred embodiment of the invention has been shown and described, it will be understood that minor changes in construction, combination and arrangement of parts may be made without departing from the spirit and scope of the invention as claimed. For example: the apparatus may be arranged to have the flue gases pass over the outside of the tubes of the rotor while the cooling water is passed through the tubes. The chemical then deposited upon the outside of the tubes may be washed off by a liquid.

From the foregoing it will be seen that the recovery of chemical from the products of combustion leaving the furnace 10 includes the steps of: (a) first cooling the products above the furnace and before entering the boiler in horizontal cross flow to the tubes to a temperature below the melting point of the chemical, to about 1200 deg. F., thereby causing a substantial portion to congeal and fall back into the furnace; (b) then further cooling the products in the boiler 12 and collecting the solid chemical from the boiler hopper and using it as part of the make up; (c) next collecting the chemical in the evaporator 28 in the liquor to be burned; and (d) finally, after cooling the products to about 300 deg. F. within the evaporator 28, condensing in the new apparatus 31 hereof a substantial portion of the now limited remaining chemical in the products and returning that condensed chemical to a dissolving tank 73 to be used as part of the make up.

What I claim is:

1. In apparatus for condensing chemical constituents and the like out of combustion gases and the like, the combination of a condenser provided with a casing, a rotor within said casing, tubes carried by said rotor, means at one side of said casing including an inlet opening in one casing end and an opposed outlet opening in the other casing end for passing the said gases to be treated through the said rotor tubes which are in register with said opposed openings in that casing side, means for maintaining the gas-contacted surfaces of those tubes at a temperature lower than that of said gases whereby the aforesaid gas constituents are caused to condense as deposits upon the named tube surfaces, means for rotating said rotor whereby to move the rotor tubes with said so received condensed deposits progressively from said gas-passing side of the casing to the opposite side thereof and thereafter on back to the gas-passing side, and means at said opposite casing side including opposed openings in the two casing ends for subjecting the rotor tubes thus successively brought into register with that opposite side to fluid jets which serve to remove the aforesaid condensed deposits from those tubes and to carry those removed deposits out of the casing.

2. In apparatus for condensing chemical constituents out of partially cooled flue gases such as are discharged by a recovery furnace when burning the combustible ingredients of waste liquor obtained in the preparation of wood pulp, the combination of a condenser provided with a casing, a rotor within said casing, conduit elements carried by said rotor and extending therethrough substantially parallel to the rotor axis, means at one side of said casing including an inlet flue entering one casing end and an opposed outlet flue leaving the other casing end for passing the said gases to be treated through the said conduit elements which are in register with said opposed flues in that casing side, means for maintaining the gas-contacted surfaces of those elements at a temperature lower than that of said gases whereby the aforesaid chemical constituents of those gases are caused to condense therefrom and deposit upon the contacted element surfaces, means for rotating said rotor whereby to move the conduit elements with said so received condensed chemical deposits progressively from said gas-passing side of the casing to the opposite side thereof and thereafter on back to the gas-passing side, and means at said opposite casing side including opposed openings in the two casing ends for subjecting the conduit elements thus successively brought into register with that opposite side to fluid jets which serve to remove the aforesaid condensed desposits from those elements and to carry those removed deposits out of the casing.

3. In apparatus for condensing chemical constituents out of partially cooled flue gases such as are discharged by a recovery furnace when burning the combustible ingredients of waste liquor obtained in the preparation of wood pulp, the combination of a condenser provided with a casing, a generally cylindrical rotor structure positioned within said casing and there disposed for rotation about the casing axis, a plurality of tubes carried by said rotor structure and extending therethrough in substantially parallel relationship to each other and to the rotor axis and in substantially uniform distribution around the rotor center, means at one side of said casing including an inlet opening in one casing end and an opposed outlet opening in the other casing end for passing the said flue gases to be treated through the interiors of the said rotor tubes which are in register with said opposed openings in that casing side, means for surrounding the exteriors of said rotor tubes with a cooling medium which maintains the inner tube surfaces at a temperature lower than that of said tube-passed gases whereby the aforesaid chemical constituents of those gases are caused to condense therefrom as deposits upon the said inner tube surfaces contacted by the gases, means for slowly rotating said rotor structure whereby to move the rotor tubes with their so received condensed chemical deposits progressively from said gas-passing side of the casing to the opposite side thereof and thereafter on back to the gas-passing side, and means at said opposite casing side including opposed openings in the two casing ends for subjecting the interior surfaces of the rotor tubes which are thus successively brought into register with that opposite casing side to fluid jets which serve to remove the aforesaid condensed deposits from those tube surfaces and to carry those removed deposits out of the casing.

4. In a system for reclaiming chemical from the products of combustion of a chemical recovery unit that comprises a smelter furnace in which chemical is recovered from black liquor sprayed into the furnace and there burned, a chamber above the furnace successively arranged with respect to the flow of the products, cooling means in the furnace and chamber to lower the temperature of the products and chemical carried therewith to approximately 1200 deg. F., a boiler through which the products and conveyed chemical pass after leaving the chamber to be cooled, means for collecting solid chemical separated from the products in the boiler, and an evaporator for further cooling the products and chemical leaving the boiler to about 300 deg. F. and removing chemical therefrom, the combination of a condenser having a casing through a first portion of which the products and remaining chemical leaving the evaporator pass, a rotor within said casing, surface elements carried by said rotor with those in register with said first casing portion serving to contact said passing products, means for maintaining said surface elements at a temperature lower than that of said contacting products whereby the aforesaid chemical therein is caused to condense therefrom and deposit upon the elements in register with said first casing portion, means for rotating said rotor whereby to move the elements thus receiving said chemical deposits from said first or product-passing portion of the casing to the opposite portion thereof and then on back to the product-passing portion, and fluid means in said opposite casing portion for removing the aforesaid chemical deposits from the surface elements which are thus successively brought into register with that opposite portion.

5. In a system for reclaiming chemical from the products of combustion of a chemical recovery unit that comprises a smelter furnace in which chemical is recovered from black liquor sprayed into the furnace and there burned, a chamber above the furnace successively arranged with respect to the flow of the products, cooling means in the furnace and chamber to lower the temperature of the products and chemical carried therewith, a boiler through which the products and conveyed chemical pass after leaving the chamber to be cooled, means for collecting solid chemical separated from the products in the boiler, and an evaporator for further cooling the products and chemical leaving the boiler to about 300 deg. F. and removing chemical therefrom, the combination of a condenser having a casing through a first portion of which the products and remaining chemical leaving the evaporator pass, a rotor in said casing provided with conduits so organized that those in register with said first casing portion established surface contact with said passing products, circulating fluid means for maintaining said conduits at a temperature lower than that of said contacting products whereby the chemical in the latter is caused to condense as a deposit upon those conduit surfaces in register with the first casing portion, means for rotating said rotor whereby to move the conduits with received deposits progressively from the first or product-passing portion of the casing to another portion thereof, and further fluid means in said other casing portion for removing the aforesaid chemical deposits from the conduits thus successively brought into register with that other portion.

6. In a system for reclaiming chemical from the products of combustion of a chemical recovery unit that comprises a smelter furnace in which chemical is recovered from the furnace and there burned, a chamber above the furnace successively arranged with respect to the flow of the products, cooling means in the furnace and chamber to lower the temperature of the products and chemical carried therewith, a boiler through which the products and conveyed chemical pass after leaving the chamber to be cooled, means for collecting solid chemical separated from the products in the boiler, and an evaporator for further cooling the products and chemical leaving the boiler to about 300 deg. F. and removing chemical therefrom, the combination of a condenser having a casing, a multiplicity of tubes arranged in parallel in said casing and carried by a rotor mounted for rotation about a central axis, means at one side of said casing for passing said products and remaining chemical from said evaporator through the said rotor-carried tubes which are in register with that casing side, means for circulating around the tube exteriors a cooling fluid which holds the tube temperature below that of said products whereby said chemical is caused to condense from the products and deposit upon the inner surfaces of said product-carrying tubes, means for rotating said rotor whereby to move the tubes with so received deposits progressively from the product-passing side of said casing to the opposite side thereof, fluid means in said opposite casing side for blowing the aforesaid chemical deposits from the tubes thus successively brought into register with that opposite side, and means for separating the removal chemical from the blowing fluid.

7. In a system for reclaiming chemical from the products of combustion of a chemical recovery unit that comprises a smelter furnace in which chemical is recovered from black liquor sprayed into the furnace and there burned, a chamber above the furnace successively arranged with respect to the flow of the products, cooling means in the furnace and chamber to lower the temperature of the products and chemical carried therewith, a boiler through which the products and conveyed chemical pass after leaving the chamber to be cooled, means for collecting solid chemical separated from the products in the boiler, and an evaporator for further cooling the products and chemical leaving the boiler to about 300 deg. F. and removing chemical therefrom, the combination of a condenser having a casing, a multiplicity of tubes arranged in parallel in said casing and carried by a rotor mounted for rotation about a central axis, means at one side of said casing for passing said products and remaining chemical from said evaporator through the said rotor-carried tubes which are in register with that casing side, means for circulating around the tube exteriors a cooling fluid which holds the tube temperature below that of said products whereby said chemical is caused to condense from the products and deposit upon the inner surfaces of said product-carrying tubes, means for rotating said rotor whereby to move those tubes with their so received deposits progressively from the product-passing side of said casing to the opposite side thereof, and means at said opposite casing side for passing through the tubes thus successively brought into register with that opposite side a weak solution of black liquor which serves to wash the aforesaid chemical deposits from those tubes and to carry same out of the casing.

FRANK W. HOCHMUTH.

REFERENCES CITED

The following references are of record in the file of this patent:

UNITED STATES PATENTS

| Number | Name | Date |
|---|---|---|
| 1,933,254 | Goodell | Oct. 31, 1933 |
| 1,970,127 | Colby | Aug. 14, 1934 |
| 2,076,033 | Kniskern | Apr. 6, 1937 |
| 2,258,467 | Owens | Oct. 7, 1941 |
| 2,303,811 | Badenhausen | Dec. 1, 1942 |

FOREIGN PATENTS

| Number | Country | Date |
|---|---|---|
| 201,960 | Great Britain | Aug. 14, 1923 |
| 479,984 | Germany | July 25, 1929 |